H. E. HAYWARD.
CHAIN LINKS.
APPLICATION FILED DEC. 18, 1909.
995,137.
Patented June 13, 1911.
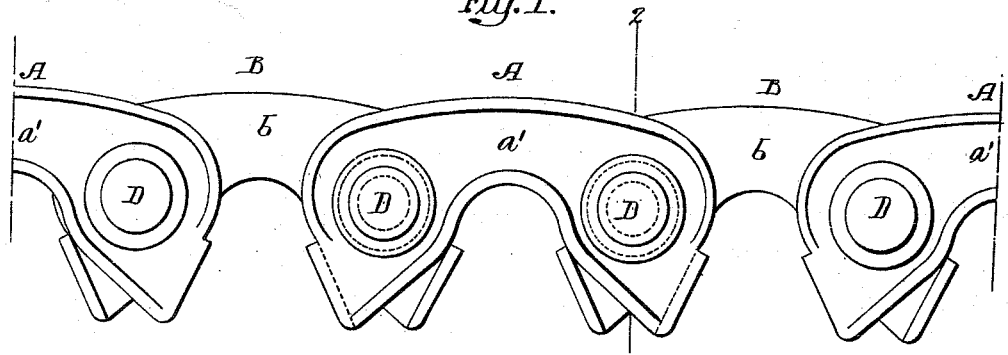
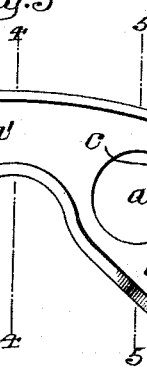
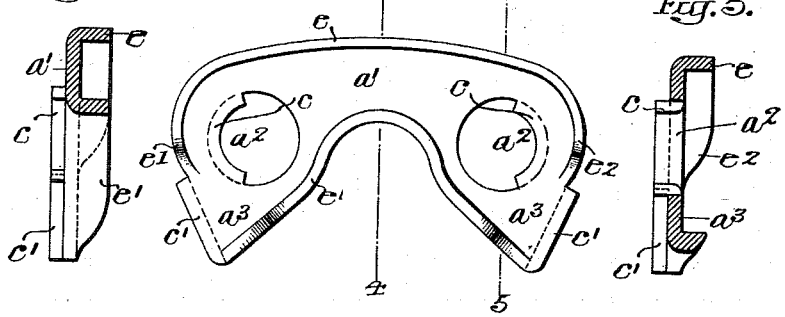
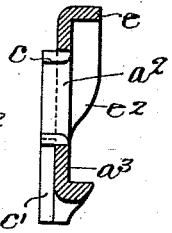
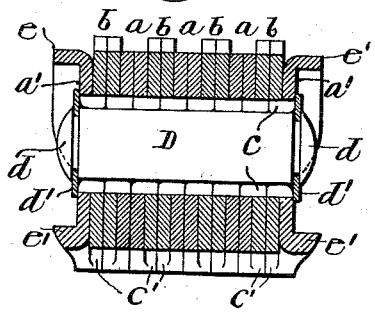
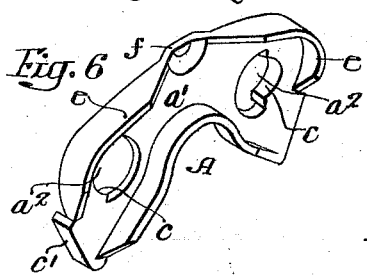
Witnesses—
Inventor—
Hervey E. Hayward.
by his Attorneys

UNITED STATES PATENT OFFICE.

HENRY E. HAYWARD, OF PHILADELPHIA, PENNSYLVANIA, ASSIGNOR TO LINK-BELT COMPANY, OF CHICAGO, ILLINOIS, A CORPORATION OF ILLINOIS.

CHAIN-LINKS.

995,137.

Specification of Letters Patent. Patented June 13, 1911.

Application filed December 18, 1909. Serial No. 533,814.

*To all whom it may concern:*

Be it known that I, HENRY E. HAYWARD, a citizen of the United States, residing in Philadelphia, Pennsylvania, have invented certain Improvements in Chain-Links, of which the following is a specification.

My invention relates to certain improvements in drive chains in which the links are provided with teeth which engage the teeth of sprocket wheels. Chains of this type are made up of a series of link elements placed side by side and one set of links is usually connected to another set by a pivot pin having projecting heads and washers.

The object of the present invention is to so construct the outside links of the chain as to protect the heads and washers of the pivot pins and at the same time strengthen the links. This object I attain in the following manner, reference being had to the accompanying drawing, in which:—

Figure 1, is a side view of a drive chain illustrating my invention; Fig. 2, is a sectional view on the line 2—2, Fig. 1; Fig. 3, is a side view of one of the outside link elements; Fig. 4, is a transverse sectional view on the line 4—4, Fig. 3; Fig. 5, is a transverse sectional view on the line 5—5, Fig. 3; and Fig. 6, is a perspective view of one of the link elements.

A and B are the chain links coupled together by pivot pins D. The links A and B are made up of link elements $a$ and $b$, respectively, placed side by side, as indicated in Fig. 2.

$a'$, $a'$ are the outside link elements of the links A and my invention relates particularly to certain improvements in these elements.

Referring now to Figs. 3, 4 and 5, $a'$ is a link element having openings $a^2$ for the passage of a pivot pin, this opening is increased in diameter at one side to receive an extended bearing of an adjoining link. The extended bearing $c$ of the link element $a'$ fits in a corresponding opening in an adjoining link. Each link element has a tooth $a^3$ at each end in the present instance, and the outer edge of the tooth has a bearing surface, and this bearing surface I preferably extend by bending the metal forming the tooth at right angles, so as to provide an extended. bearing $c'$. The pivot pin D in the present instance is reduced at each end and a washer $d'$ is mounted on the reduced end, and the projecting portions of the pivot pin are riveted, forming heads $d$ which project beyond the washers. The heads and washers project beyond the surface of the body of the link element $a'$ and in order to protect the heads of the pivot pins I flange the link elements $a'$ at $e$ and $e'$; the flange $e$ extends along the upper edge of the link elements $a'$ and is tapered at $e^2$ toward the bearing $c'$ of the teeth $a^3$, while the flange $e'$ extends along the lower edge of the teeth, as indicated in Fig. 3, and is tapered at each tooth. These two flanges not only protect the pivot pin from wear due to rubbing against the flanges of the wheels, but also materially strengthen the link and do not interfere with the proper running of the chain.

I may, in some instances, form a lateral projection on the upper edge of the link, as at $f$, Fig. 6, this projection extending laterally the same distance as the extended bearings $c, c'$, contacting with a projection on an adjoining link. This particular feature is set forth and claimed in a pending application filed by James M. Dodge, November 6th, 1909, under Serial No. 526,536.

I do not in this application claim the extended tooth bearing or the extended bearings for the pivot pins in themselves, as my invention is limited to the features set forth in the claims following.

I claim:—

1. The combination in a chain of a plurality of sets of links, alternate sets of said links including one or more plane links and two flanged links respectively mounted on the outer sides of said plane link or links, with means for connecting the various links.

2. The combination in a chain of a plurality of sets of links having openings and extended bearings capable of fitting openings in other links, certain of said sets of links including one or more plane links and flanged outside links, with means for holding the links together.

3. The combination in a chain of a plurality of sets of links having openings and extended bearings capable of fitting openings in other links, certain of said sets of links including one or more plane links and flanged outside links, both the plane and the flanged links having teeth provided with laterally extending bearing faces.

4. A chain link element having openings for pivot pins and provided with teeth having bearing faces extending at an angle to each other, with a flange projecting from one edge of the link element and terminating adjacent to said bearing surfaces.

5. A chain made up of a series of sets of link elements; headed pivot pins connecting the elements of one set with those of another set; washers on the pivot pins bearing against the outer link elements, said latter elements having flanges at the top and bottom extending beyond the heads of the pivots; the link elements having extended bearings for the pivot pins and being provided with teeth having laterally extended bearings.

6. A chain link element having openings for pivot pins and provided with teeth having bearing faces extending at an angle to each other, with flanges projecting from the top and bottom edges of the link and terminating adjacent said bearing surfaces of the teeth.

7. A chain link element consisting of a plate having teeth and openings for pivot pins, laterally extended bearings adjacent said openings, laterally extended bearings for the teeth, and a laterally projecting flange on the link.

In testimony whereof, I have signed my name to this specification, in the presence of two subscribing witnesses.

HENRY E. HAYWARD.

Witnesses:
WALTER CHISM,
WM. A. BARR.

---

Copies of this patent may be obtained for five cents each, by addressing the "Commissioner of Patents, Washington, D. C."